(12) United States Patent
Sawasaki et al.

(10) Patent No.: US 8,445,099 B2
(45) Date of Patent: May 21, 2013

(54) POLYIMIDE FILM

(75) Inventors: Kouichi Sawasaki, Nagoya (JP); Masahiro Oguni, Nagoya (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 386 days.

(21) Appl. No.: 12/952,474

(22) Filed: Nov. 23, 2010

(65) Prior Publication Data

US 2011/0293910 A1 Dec. 1, 2011

(30) Foreign Application Priority Data

Nov. 30, 2009 (JP) ................................. 2009-271942

(51) Int. Cl.
*B32B 27/00* (2006.01)
*B29C 55/14* (2006.01)
(52) U.S. Cl.
USPC .......................................... 428/220; 264/164
(58) Field of Classification Search
USPC .......................................... 428/220; 264/164
See application file for complete search history.

(56) References Cited

U.S. PATENT DOCUMENTS

| | | | | |
|---|---|---|---|---|
| 5,460,890 | A * | 10/1995 | Okahashi et al. | 428/458 |
| 2005/0020803 | A1 * | 1/2005 | Machida et al. | 528/196 |
| 2007/0100127 | A1 * | 5/2007 | Ishiwata et al. | 528/310 |
| 2008/0118730 | A1 * | 5/2008 | Yu et al. | 428/220 |
| 2009/0191362 | A1 * | 7/2009 | Tanaka et al. | 428/1.31 |

FOREIGN PATENT DOCUMENTS

| | | |
|---|---|---|
| JP | 59-164328 | 9/1984 |
| JP | 60-210629 | 1/1985 |
| JP | 61-111359 | 5/1986 |
| JP | 64-16832 | 1/1989 |
| JP | 64-16833 | 1/1989 |
| JP | 64-16834 | 1/1989 |
| JP | 64-20238 | 1/1989 |
| JP | 1-131241 | 5/1989 |
| JP | 1-131242 | 5/1989 |
| JP | 4-25434 | 1/1992 |
| JP | 5-25273 | 2/1993 |

* cited by examiner

*Primary Examiner* — David Sample
*Assistant Examiner* — Tahseen N Khan

(57) ABSTRACT

The present invention is directed to a polyimide film with a uniform orientation angle in the transverse direction of the film. A polyimide film characterized by the fact that the width of the fabricated film is $\geq 1.5$ m, 2 points positioned inside by 200 mm from both ends of the width of the fabricated film are selected on a linear line in the vertical direction to the machine direction (MD) of the film, 1 point within center part $\pm 200$ mm, and 2 optional points are further selected on a linear line that includes said 2 points within the range of the linear line that connects said 2 points, and the orientation angle ($\theta$) is within a range of $90°\pm 23°$ in at least all of these 8 points.

10 Claims, 8 Drawing Sheets

POLYIMIDE FILM

CROSS-REFERENCE TO RELATED APPLICATION

This application claims priority to Japanese Patent Application 2009-271942 filed Nov. 30, 2009.

FIELD OF DISCLOSURE

The present invention relates to a polyimide film. More specifically, it relates to a polyimide film with uniform orientation angles.

BACKGROUND

Polyimide has superior heat resistance and electrical insulation and is mainly used as a polyimide film in applications such as flexible printed circuit boards, etc. The requirements of polyimide films used in these applications have increased with miniaturization of the flexible printed circuit boards and semiconductor packages. For example, to have a linear thermal expansion coefficient comparable to metals, a high elastic modulus, and minimal dimensional change from water absorption are necessary properties for the polyimide films and polyimide films that meet these requirements have been developed (Patent Documents 1-6).

Examples of a three-component polyimide consisting of anhydrous pyromellitic acid, 4,4'-diaminodiphenyl ether, and paraphenylene diamine, which combined the paraphenylene diamine as the diamine compound for enhancing the elastic modulus are described in Patent Documents 1-6. Furthermore, development to four-component polyimide has also been carried out, which added 3,3'-4,4'-biphenyl tetracarboxylic dianhydride to the aforementioned three-component polyimide to further enhance the elastic modulus (Patent Documents 7, 8). In addition, an attempt has been made to improve the properties by controlling the procedure for adding the monomer at the time of polymerization in the four-component polyimide (Patent Document 9). An attempt has also been made to improve the properties by carrying out drawing at the time of the film is fabricated (Patent Documents 10).

Furthermore, development of a polyimide film, which provided anisotropic property by setting the linear thermal expansion coefficient in the machine direction (hereinafter also referred to as MD) of the film to be smaller than the linear thermal expansion coefficient in the transverse direction (hereinafter also referred to as TD) of the film in order to suppress the dimensional change during the process of bonding with the metal has also been carried out (Patent Documents 11). The purpose of this is to offset the phenomenon wherein elongation occurs in MD of the film and contraction occurs in TD of the film from tension being applied in the FPC (Flexible Printed Circuit) process wherein the lamination method is usually employed and carries out the bonding with the metal by roll-to-roll heating.

However, in all of the aforementioned polyimide films, difference was created in the orientation angles at the center part and the end parts in the transverse direction in polyimide films obtained according to drawing, and variance was created according to the position on the film. Consequently, problems such as the physical properties varying according to the using section were created, and there was a need to develop a polyimide film having uniform orientation angles in the transverse direction of the film.

DESCRIPTION OF RELATED ART

[Patent Document 1] The gazette of Kokai Patent Application Number Sho 60[1985]-210629
[Patent Document 2] The gazette of Kokai Patent Application Number Sho 64[1989]-16832
[Patent Document 3] The gazette of Kokai Patent Application Number Sho 64[1989]-16833
[Patent Document 4] The gazette of Kokai Patent Application Number Sho 64[1989]-16834
[Patent Document 5] The gazette of Kokai Patent Application Number Hei 1[1989]-131241
[Patent Document 6] The gazette of Kokai Patent Application Number Hei 1[1989]-131242
[Patent Document 7] The gazette of Kokai Patent Application Number Sho 59[1984]-164328
[Patent Document 8] The gazette of Kokai Patent Application Number Sho 61[1986]-111359
[Patent Document 9] The gazette of Kokai Patent Application Number Hei 5[1993]-25273
[Patent Document 10] The gazette of Kokai Patent Application Number Hei 1[1989]-20238
[Patent Document 11] The gazette of Kokai Patent Application Number Hei 4[1992]-25434

SUMMARY

The purpose of the present invention is to provide a polyimide with uniform orientation angles in the transverse direction of the film.

As a result of carrying out research assiduously for the abovementioned purpose, the present inventors found that a polyimide with uniform orientation angles in the transverse direction of the film can be obtained by drawing in the machine direction (MD) of the film in two steps, and completed the present invention after carrying out further study.

DETAILED DESCRIPTION

Figure 1:
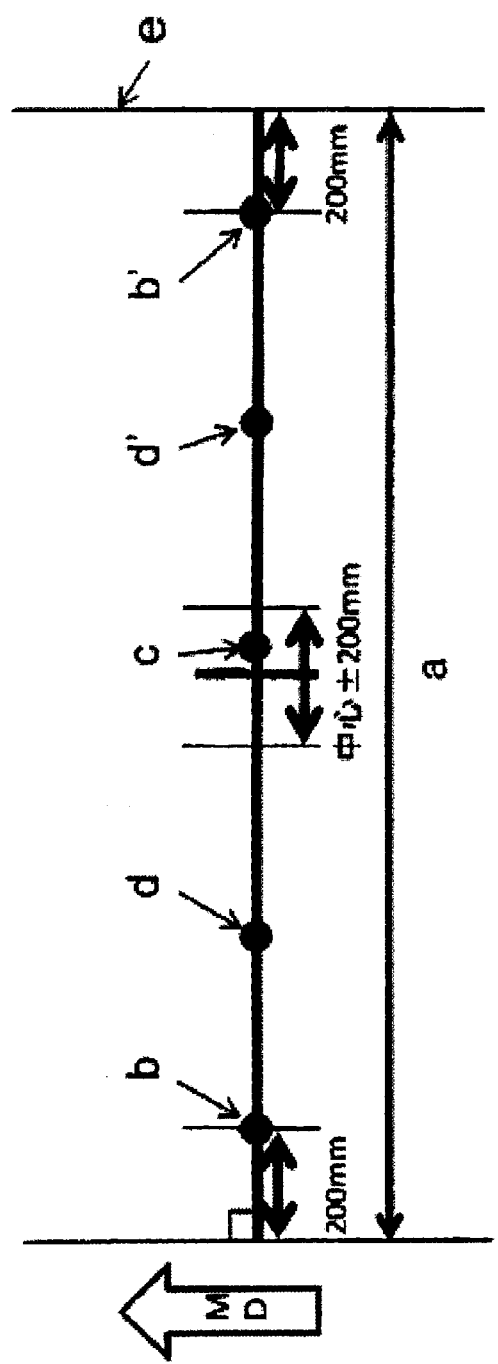
FIG. 1 is a schematic diagram showing the positions for measuring orientation angle ($\theta$) of the polyimide film in the present invention. The blank arrow indicates the machine direction (MD) of the film.

Namely, the present invention is as follows.

A polyimide film characterized by the fact that the width of the fabricated film is ≧1 m, 2 points positioned inside by 200 mm from both ends of the width of the fabricated film are selected on a linear line in the vertical direction to the machine direction (MD) of the film, 1 point within center part ±200 mm, and 2 optional points are further selected on a linear line that includes said 2 points within the range of the linear line that connects said 2 points, and the orientation angle (θ) is within a range of 90°±23° with the machine direction (MD) as a reference in at least all of these 5 points.

The polyimide film characterized by the fact that the orientation angle (θ) is within a range of 90°±12° with the machine direction (MD) as a reference.

A polyimide film characterized by the fact that the width of the fabricated film is ≧1.5 m, 2 points positioned inside by 200 mm from both ends of the width of the fabricated film are selected on a linear line in the vertical direction to the machine direction (MD) of the film, 1 point within center part ±150 mm, and 5 optional points are further selected on a linear line that includes said 2 points within the range of the linear line that connects said 2 points, and the orientation angle (θ) is within a range of 90°±23° with the machine direction (MD) as a reference in at least all of these 8 points.

A polyimide film as described above characterized by the fact that orientation angle (θ) is within a range of 90°±12° with the machine direction (MD) as a reference.

A polyimide film characterized by the fact that the width of the fabricated film is ≧2 m, 2 points positioned inside by 200 mm from both ends of the width of the fabricated film are selected on a linear line in vertical direction to the machine direction (MD) of the film, 1 point within center part ±100 mm, and 8 optional points are further selected on a linear line that includes said 2 points within the range of the linear line that connects said 2 points, and the orientation angle (θ) is within a range of 90°±23° with the machine direction (MD) as a reference in at least all of these 11 points.

A polyimide film as described above characterized by the fact that orientation angle (θ) is within a range of 90°±12° with the machine direction (MD) as a reference.

Any of polyimide film as described above characterized by the fact that the polyimide film is drawn according to biaxial drawing process in the machine direction (MD) and transverse direction (TD) of the film and the MD drawing is a 2-step drawing.

A polyimide film characterized by the fact that the drawing rate in the first step of the 2-step MD drawing process is ≧40% of the total MD drawing rate.

A polyimide film characterized by the fact that the TD drawing rate is ≧1.10 and ≦1.50 of the total MD drawing rate.

A polyimide characterized by the fact that the polyimide film is manufactured from a polyamide acid composed from an aromatic diamine component wherein the mol ratio of 4,4'-diamino diphenyl ether and/or 3,4'-diamino diphenyl ether and paraphenylene diamine is 69/31-90/10 and an acid anhydride component wherein the mol ratio of pyromellitic acid dianhydride and 3,3',4,4'-biphenyl tetracarboxylic acid dianhydride is 80/20-60/40 or manufactured from a polyamide acid composed from an aromatic diamine component which is a paraphenylene diamine and a 3,3',4,4'-biphenyl tetracarboxylic acid dianhydride component, and the mol ratio of the aromatic diamine component and the acid anhydride component is 40/60-60/40.

The polyimide film characterized by the fact that microsilica wherein the grain size of all particles is ≧0.01 μm and ≦1.5 μm and the particles with grain size of ≧0.10 μm and ≦0.90 μm accounts for ≧80 vol % of all particles is evenly dispersed in the film at a ratio of ≧0.30 wt % and ≦0.80 wt % of the film resin weight.

Effects of the Invention

The polyimide film of the present invention has uniform orientation angles regardless of the position on the film. Therefore, problems such as the dimensional stability varying according to the position are not created when bonding said polyimide film to a substrate composed of glass or the like as a COF (Chip on Film) substrate, or problems such as the degree of the warp varying when said polyimide film and copper are laminated. Also, the physical properties of the polyimide film in the present invention are uniform. Therefore, proper use according to the section of the film, processing such as cutting into sections, etc. are unnecessary, and is advantageous for fine pitch circuit boards requiring dimensional precision, particularly for COP (Chip on Film) which are wired at a narrow pitch in TD of the film.

Embodiments of the Invention

Figure 2:
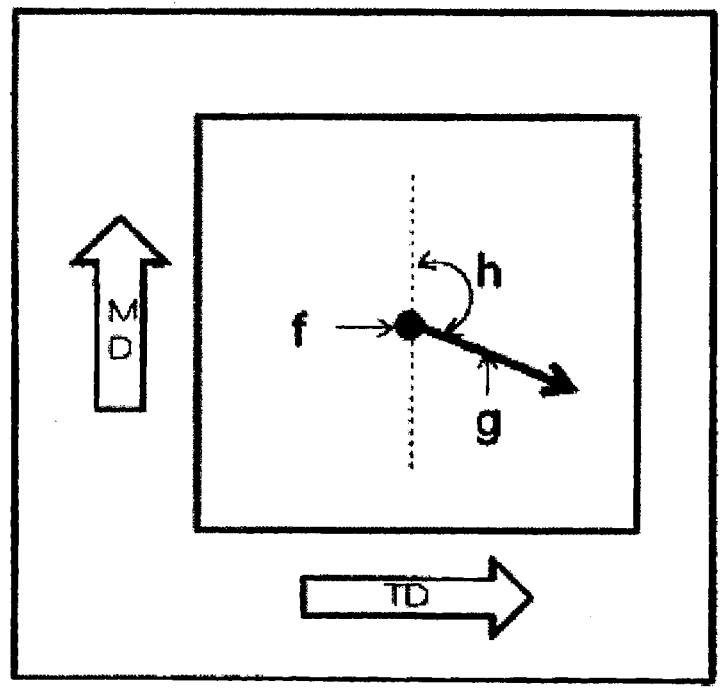
FIG. 2 is a schematic diagram showing the orientation axis and orientation angle ($\theta$). The blank arrows indicate the machine direction (MD) and transverse direction (TD) of the film.
Figure 3:
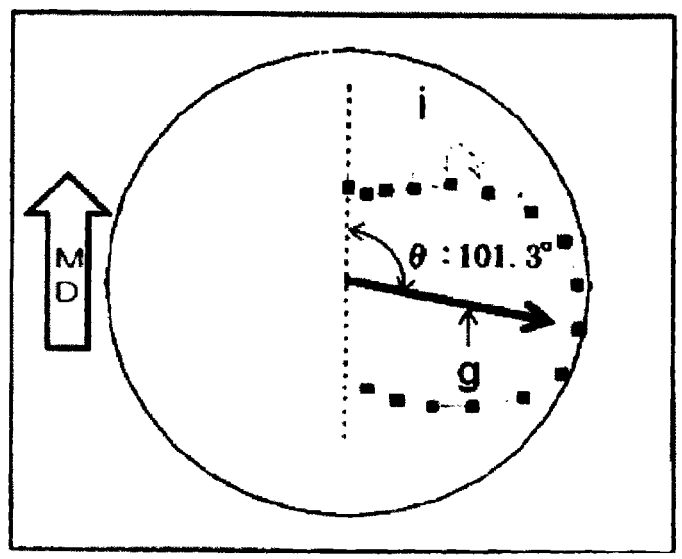
FIG. 3 is a measurement example, which composed the speed of the ultrasonic wave at each angle into a radar graph, drew the orientation axis in the graph, and calculated the 101.3° as orientation angle ($\theta$). The blank arrow indicates the machine direction (MD) of the film.

Below, the present invention will be explained in details. The polyimide film in the present invention characterized by the fact that the width of the fabricated film is ≧1 m, 2 points positioned inside by 200 mm from both ends of the width of the fabricated film are selected on a linear line in the vertical direction to the machine direction (MD) of the film, 1 point within center part ±200 mm, and 2 optional points are further selected on a linear line that includes said 2 points within the range of the linear line that connects said 2 points, and the orientation angle (θ) is within a range of 90°±23° with the machine direction (MD) as a reference in at least all of these 5 points. The aforementioned 5 points of the polyimide film are shown in FIG. 1. In the polyimide film of the present invention, it is preferable to select 1 point within center part ±150 mm on the linear line that includes said 2 points as the point at the peripheral of the center part within the range of the linear line that connects the 2 points (b and b') positioned inside by 200 mm from both ends of the width of the fabricated film on the aforementioned linear line in the vertical direction to the MD, and it is more preferable to select 1 point within center part ±100 mm. Furthermore, it is preferable to select 5 points as the optional points other than the points at the vicinity of the center part within the range of the linear line connecting the aforementioned 2 points, selecting 8 points is more preferable, and selecting 11 points is especially preferable. The width of the polyimide film in the present invention is not restricted in particular. However, it is normally ≧1 m, ≧1.5 m is preferable, and ≧2 m is more preferable. Also, it is preferable for the width of the polyimide film to be ≦3 m. The orientation angle (θ) in the present invention means the direction of the orientation axis and expresses the angle on the side the reference line was rotated in the clockwise direction with the machine direction (MD) of the film at zero degree as the reference line as shown in FIG. 2. It is preferable for the orientation angle (θ) of the polyimide film in the present invention to be in the range of 90°±23° and more preferable to be within the range of 90°±12°. Here, the orientation axis of orientation angle 90° is oriented at a parallel to the transverse direction (TD) of the film. Namely, the fact that the orientation angle is within the aforementioned range means that the orientation axis is approximately oriented in the TD direction over the entire width of the film and that the variance is minimal. Consequently, the physical properties of the film is similar at all positions and the dimensional stability in TD is high, thus it is favorable. If the orientation angle (θ) exceeds 90°±23°, the TD orientation of the film is destroyed and even the physical properties change, which is not favorable. The orientation angle in the present invention is measured by using orientation analyzer SST-2500 (Sonic Sheet Tester) manufactured by Nomura Shoji Co., Ltd. When SST-2500 is used, the planar directions 0-180° (0° is parallel to MD) of the film are automatically measured according to the speed of ultrasonic wave in 16 directions at a pitch of 11.25°. A pattern like those shown in FIG. 3 is depicted when a radar graph is composed from the obtained speeds in each direction (the graph function of Microsoft Excel was used). The line that was drawn toward the section that is most expanded in the pattern from the center of the radar graph is the orientation axis, the angle of the orientation axis is measured from here with MD as the reference line, and this is defined as the orientation angle. FIG. 3 and Table 1 are the measured examples of the orientation angle. FIG. 3 was obtained by composing a radar graph based on the results of the speed of ultrasonic wave at each angle in Table 1 measured with SST-2500 and orientation angle "101.3°" was calculated.

TABLE 1

| Direction (°) | Speed of ultrasonic wave (kg/s) |
|---|---|
| 0.00 | 2.405 |
| 11.25 | 2.395 |
| 22.50 | 2.414 |
| 33.75 | 2.449 |
| 45.00 | 2.505 |
| 56.25 | 2.548 |
| 67.50 | 2.614 |
| 78.75 | 2.661 |
| 90.00 | 2.679 |
| 101.25 | 2.691 |
| 112.50 | 2.685 |
| 123.75 | 2.643 |
| 135.00 | 2.570 |
| 146.25 | 2.516 |
| 157.50 | 2.474 |
| 168.75 | 2.429 |

Next, the method for manufacturing the polyimide film in the present invention will be explained in details below. The manufacturing process can include for example, (1) the process of obtaining a polyimide acid solution by polymerizing an aromatic diamine component and an acid anhydride component in an organic solvent, (2) the process of obtaining a gel film by applying cyclization reaction to the polyamide acid solution obtained in the aforementioned process (1), and (3) the process of applying biaxial drawing process to the gel film obtained in the aforementioned process (2) in MD and TD wherein the MD drawing (hereinafter also referred to as vertical drawing) is a 2-step drawing process and the TD drawing rate is ≧1.10 times and ≦1.50 times of the total MD drawing rate.

Process (1) is the process for obtaining a polyimide acid solution by polymerizing an aromatic diamine component and an acid anhydride component in an organic solvent.

As specific examples of the aforementioned aromatic diamine, there are no restrictions as long as the effects of the present invention are not undermined. However, paraphenylene diamine, metaphenylene diamine, benzidine, paraxylylene diamine, 4,4'-diamino diphenyl ether, 3,4'-diamino diphenyl ether, 4,4'-diamino diphenyl methane, 4,4'-diamino diphenyl sulfone, 3,3'-dimethyl-4,4'-diamino diphenyl methane, 1,5-diamino naphthalene, 3,3'-dimethoxy benzidine, 1,4-bis (3 methyl-5 aminophenyl)benzene or amide forming derivatives of these can be cited. Here, it is preferable to adjust the amount of diamine in paraphenylene diamine, 3,4'-diamino diphenyl ether, etc., which have an effect of enhancing the elastic modulus of the film and make the elastic modulus of the final polyimide film to be ≧4.0 Gpa. These aromatic diamines can be used independently or by mixing 2 or more kinds. From among these aromatic diamines, paraphenylene diamine, 4,4'-diamino diphenyl ether, and 3,4'-diamino diphenyl ether are favorable. When combining paraphenylene diamine with 4,4'-diamino diphenyl ether and/or 3,4'-diamino diphenyl ether, it is preferable to use (i) 4,4'-diamino diphenyl ether and/or 3,4'-diamino diphenyl ether and (ii) paraphenylene diamine in 69/31-90/10 (mol ratio) and using in 70/30-85/15 (mol ratio) is more favorable.

As specific examples of the aforementioned acid anhydride component, there are no restrictions as long as the effects of the present invention are not undermined. However, acid anhydrides such as pyromellitic acid, 3,3',4,4'-biphenyl tetracarboxylic acid, 2,3',3,4'-biphenyl tetracarboxylic acid, 3,3',4,4'-benzophenone tetracarboxylic acid, 2,3,6,7-napthalene dicarboxylic acid, 2,2-bis(3,4-dicarboxy phenyl)ether, pyridine-2,3,5,6-tetracarboxylic acid, or amide forming derivatives of these can be cited, acid dianhydrides such as aromatic tetracarboxylic acid is favorable and pyromellitic acid dianhydride and/or 3,3',4,4'-biphenyl tetracarboxylic acid dianhydride are especially favorable. These acid anhydride components can be used independently or by mixing 2 or more kinds. Also, from among these, it is preferable to use pyromellitic acid dianhydride and 3,3',4,4'-biphenyl tetracarboxylic acid dianhydride in 80/20-60/40 (mol ratio) and using in 75/25-65/35 (mol ratio) is more favorable.

There are no restrictions in terms of the organic solvent used for forming the polyamide acid solution in the present invention. However, for example, sulfoxide solvents such as dimethyl sulfoxide, diethyl sulfoxide, etc.; formamide solvents such as N,N-dimethyl formamide, N,N-diethyl formamide, etc.; acetamides such as s N,N-dimethyl acetamide, N,N-diethyl acetamide, etc.; pyrrolidone solvents such as N-methyl-2-pyrrolidone, N-vinyl-2-pyrrolidone, etc.; phenol solvents such as phenol, o-m- or p-cresol, xylene, halogenated phenol, catechol, etc.; or solvents of nonpolarized protons such as hexamethyl phosphoramide, γ-butyrolactone, etc. can be cited. It is preferable to use these independently or as a mixture. However, it is possible to further use aromatic hydrocarbon such as xylene and toluene.

The polymerization method can be any commonly known methods and is not particularly restricted. However, for example, the following method can be cited:

(i) the polymerization method of charging the total amount of aromatic diamine first into the organic solvent and adding the acid anhydride component thereafter so that the amount is made equivalent to the total amount of the aromatic diamine component, (ii) the polymerization method of charging the total amount of acid anhydride component first into the solvent and adding the aromatic diamine component thereafter so that the amount is made equivalent to the total amount of the acid anhydride, (iii) the polymerization method of charging one of the aromatic diamine components into the solvent, mixing for the time necessary for the reaction at a ratio for the acid anhydride component to be made 95-105 mol % with respect to the reaction component, adding the other aromatic diamine component, and adding the acid anhydride component so that the total amount of the aromatic diamine components and the amount of acid anhydride component are made approximate equal, (iv) the polymerization method of charging the acid anhydride component into the solvent, mixing for the time necessary for the reaction at a ratio for one of the aromatic diamine component to be made 95-105 mol % with respect to the reaction component, adding the acid anhydride component, and adding the other aromatic diamine component so that the total amount of the aromatic diamine components and the amount of acid anhydride component are made approximate equal, (v) the method of preparing a polyamide acid solution (A) by reacting one of the aromatic diamine components and the acid anhydride component in a solvent so that one of the two becomes excessive, preparing polyamide acid solution (B) by reacting the other aromatic diamine component and the acid anhydride component in another solvent so that one of the two becomes excessive, and mixing the prepared polyamide acid solutions (A) and (B) to complete the polymerization, (vi) the preparation method of making the acid anhydride component excessive in polyamide acid solution (B) if the other aromatic diamine component was excessive when polyamide acid solution (A) was prepared, making the aromatic diamine component excessive in polyamide acid solution (B) if the acid anhydride component was excessive in polyamide acid solution (A), and mixing polyamide acid solutions (A) and (B) so that total amount of aromatic diamine components and the amount of acid anhydride component used in the reaction are made approximate equal, etc.

It is preferable for the polyamide acid solution obtained in the manner described above to contain 5-40 wt % of solid part and containing 10-30 wt % is more favorable. Also, the viscosity of the polyamide acid solution is a value measured with a rotational viscometer, which uses a black field viscometer in compliance with JIS K6726-1994 and though there is no particular restriction, it is preferable to have a viscosity of 10-2000 Pa·s (100-20000 poise), and it is more preferable to have a viscosity of 100-1000 Pa·s (1000-10000 poise) from the standpoint of feeding the liquid stably. Also, the polyamide acid in the organic solvent can be partially imidized.

The polyamide acid solution in the present invention can contain chemically inactive organic fillers and inorganic fillers such as titanium oxide, microsilica, calcium carbonate, calcium phosphate, calcium hydrophosphate, polyimide filler, and the like, with silica being particularly favorable.

The inorganic filler (inorganic particles) used in the present invention is not particularly restricted. However, inorganic fillers with grain size of all particles of $\geq 0.005$ µm and $\leq 2.0$ µm is favorable, with the grain size of all particles of $\geq 0.01$ µm and $\leq 1.5$ µm being more favorable. There are no restrictions regarding the grain distribution (volumetric standard). However, inorganic fillers wherein the particles of grain size $\geq 0.10$ µm and $\leq 0.90$ µm accounts for $\geq 80$ vol % of all particles is favorable, inorganic fillers wherein the particles of grain size $\geq 0.10$ µm and $\leq 0.75$ µm accounts for $\geq 80$ vol % of all particles is more favorable, and inorganic fillers wherein the particles of grain size $\geq 0.10$ µm and $\leq 0.60$ µm accounts for $\geq 80$ vol % of all particles is especially favorable. Also, the average grain size of the inorganic filler used in the present invention is not particularly restricted. However, $\geq 0.05$ µm and $\leq 0.70$ µm is favorable, $\geq 0.10$ µm and $\leq 0.60$ µm is more favorable, and $\geq 0.30$ µm and $\leq 0.50$ µm is especially favorable. If the average grain size is $\leq 0.05$ µm, slidability of the film decreases, which is not favorable. If it is $\geq 0.70$ µm, large particles are created locally, which is also not favorable. The aforementioned viscosity distribution, average grain size, and range of grain size can be measured using laser diffraction/scattering particle size distribution analyzer LA-910 manufactured by Horiba Seisakusho, Co., Ltd. The aforementioned average grain size indicates the average volumetric grain size.

The inorganic filler used in the present invention is not particularly restricted. However, it is preferable for the inorganic filler to be dispersed evenly in the film at a ratio of $\geq 0.03$ wt % and $\leq 1.0$ wt % with respect to the weight of the polyamide acid solution and ratio of $\geq 0.30$ wt % and $\leq 0.80$ wt % is more preferable from the standpoint of the slidability. The mechanical strength decreases at $\geq 1.0$ wt % and sufficient slidability cannot be achieved at $\leq 0.03$ wt %, hence it is not favorable. From among these, a polyimide film dispersed evenly with microsilica wherein the grain size of all particles is $\geq 0.01$ µm and $\leq 1.5$ µm and the particles having grain size of $\geq 0.10$ µm and $\leq 0.90$ µm accounts for $\geq 80$ vol % of all particles in the film at a ratio of $\geq 0.30$ wt % and $\leq 0.80$ wt % of the film resin weight is especially favorable.

Process (2) is the process for obtaining a gel film by causing a cyclization reaction to the polyamide acid solution obtained in the aforementioned process (1). The method for causing a cyclization reaction to the aforementioned polyamide acid solution is not restricted in particular. Specifically, (i) the method of obtaining a gel film by casting the aforementioned polyamide acid solution into a film shape and causing a dehydration cyclization under thermal conditions (thermal cyclization method) or (ii) the method of obtaining a gel film by mixing a cyclization catalyst and an inverting agent to the aforementioned polyamide acid solution, causing a chemical and dehydration cyclization to form a gel film, and heating (chemical cyclization method) can be cited. The latter method is preferable from the standpoint of being able to compose uniform orientation angles in the transverse direction of the obtained polyimide film.

The aforementioned cyclization catalyst is not restricted in particular. For example, aliphatic tertiary amines such as trimethyl amine, triethylene diamine, etc.; aromatic tertiary amines such as dimethyl aniline, etc.; heterocyclic tertiary amines such as isoquinoline, pyridine, β-picoline, etc. can be cited, and one or more kinds of heterocyclic tertiary amines selected from a group comprising isoquinoline, pyridine, and β-picoline is favorable. The aforementioned inverting agent is not restricted in particular. For example, aliphatic carboxylic acid anhydrides such as anhydrous acetate, anhydrous propionic acid, anhydrous butyric acid, etc.; aromatic carboxylic acid anhydrides such as anhydrous benzoic acid, etc. can be cited, with anhydrous acetate and/or anhydrous benzoic acid being favorable. The content of these inverting agents is not restricted in particular. However, about 10-40 wt % with respect to 100 wt % of the polyamide acid solution is favorable, with about 15-30 wt % being more favorable.

The aforementioned polyamide acid solution is cast into a film shape through a slit shaped die, flow stretched on a heated support, thermal cyclization reaction is carried out on the support, forming a gel film having self supporting property, and [the film is] separated from the support.

The aforementioned support is not particularly restricted. However, a rotary drum made of metal (e.g., stainless steel), endless belt, etc. can be cited as examples. The temperature of the support is controlled according to the radiated heat of the (i) liquid or gas heating medium, (ii) electric heater, etc. and is not restricted in particular.

The aforementioned gel film is provided with self supporting property by causing a cyclization reaction by heating preferably to 30-200° C., more preferably, to 40-150° C. with the heat received from the support, the heat received from a heat source such as hot air and electric heater, etc. and drying the volatile components such as the freed organic solvent, etc., and then, it is separated from the support.

Process (3) is the process for applying a biaxial drawing process to the gel film obtained in the aforementioned process (2) in MD and TD wherein the MD drawing is a 2-step drawing and the TD drawing rate is $\geq 1.10$ times and $\leq 1.50$ times of the MD drawing rate.

The gel film separated from the aforementioned support is drawn in the running direction (MD) while regulating the running speed with a rotating roll. The rotating roll needs to have the grip strength necessary for regulating the running speed of the gel film. Using a nip roll made by combining a metal roll and a rubber roll, a vacuum roll, a multi-tension cut roll, or a decompression suction-type succession roll as the rotating roll is favorable.

Biaxial drawing process is carried out in process (3). The order in the aforementioned biaxial drawing process is not restricted in particular. However, it is preferable to carry out drawing (vertical drawing) in the machine direction (MD) and then carry out the drawing in the transverse direction (TD) (hereinafter also referred to as horizontal drawing). Also, it is more favorable to carry out the vertical drawing and carry out the horizontal drawing after applying a heat treatment or concurrent to the heat treatment.

The MD drawing (vertical drawing) in the aforementioned biaxial drawing process is carried out in 2 steps in order to compose uniform orientation angles in the transverse direction of the polyimide film. The drawing rate in the first step (hereinafter also referred to as vertical drawing rate) in the 2-step MD drawing is not restricted in particular. However, $\geq 1.02$ times and $\leq 1.3$ times is favorable and $\geq 1.04 \leq 1.1$ times is more favorable from the standpoint of being able to enhance the uniformity in the orientation angles in the transverse direction of the polyimide film. As the MD drawing rate in the second step, $\geq 1.02$ times and $\leq 1.3$ times is favorable and $\geq 1.04 \leq 1.1$ times is more favorable from the standpoint of being able to further enhance the uniformity in the orientation angles of the polyimide film. Also, it is preferable for the drawing rate in the first step to be $\geq 40\%$ of the total MD drawing rate from the standpoint of being able to compose uniform orientation angles in the transverse direction of the polyimide film and $\geq 50\%$ and $\leq 80\%$ is more favorable from the standpoint of being able to further enhance the uniformity of the orientation angles in the transverse direction of the polyimide film. As the total MD drawing rate, $\geq 1.04 \leq 1.4$ times is favorable and $\geq 1.05 \leq 1.3$ times is more favorable. The MD drawing temperature is not restricted in particular. However, 60-100° C. is favorable and 70° C.-90° C. is more favorable. The MD drawing speed is not restricted in particular. However, about 1%/min-20%/min is favorable as the drawing speed in the first step of the aforementioned 2-step drawing from the stand point of being able to further enhance the uniformity of the orientation angles in the transverse direction of the polyimide film, and about 2%/min-10%/min is more favorable. About 1%/min-20%/min is favorable as the drawing speed in the second step of the aforementioned 2-step drawing, and about 2%/min-10%/min is more favorable. The drawing time in each step is not restricted in the 2-step MD drawing. However, it is about 5 seconds-5 minutes and 10 seconds-3 minutes is favorable.

When applying the heat treatment after carrying out the aforementioned MD drawing, the heating temperature is not restricted in particular. However, about 180° C.-500° C. is favorable and about 200° C.-450° C. is more favorable. As the heat treatment time, 30 seconds-20 minutes is favorable and 50 seconds-10 minutes is more favorable. Also, the heat treatment can be carried out in multiple steps at varying temperatures. Heaters such as a casting furnace or heating furnace having a plurality of blocks (zones) of varying temperatures can be used for the heat treatment. It is preferable to carry out the heat treatment by fixing the both ends of the film with a pin-type tenter, clip-type tenter, chuck, etc. The solvent can be removed with this heat treatment.

The gel film drawing in MD is introduced to the tenter and drawn in the transverse direction (TD) by the two ends in the transverse direction being held by the tenter clips and running together with the tenter clips. The TD drawing rate (hereinafter also referred to as horizontal drawing rate) is not restricted in particular. However, a drawing rate of $\geq 1.35$ times and $\leq 2.0$ times is favorable and a drawing rate of $\geq 1.40$ times and $\leq 1.8$ times is more favorable from the standpoint of being able to further enhance the uniformity of the orientation angles in the transverse direction of the film. It is necessary to set the TD drawing rate (horizontal drawing rate) to be higher than the MD drawing rate (vertical drawing rate). Specifically, it is normally $\geq 1.10$ times and $\leq 1.50$ times of the total MD drawing rate and $\geq 1.15$ times and $\leq 1.45$ times is preferable from the standpoint of being able to further enhance the uniformity of the orientation angles in the transverse direction of the film. If the MD drawing is the aforementioned 2-step drawing and the TD drawing rate is set to be higher than the MD drawing rate of the film, it is possible to obtain a film which maintains a linear thermal expansion coefficient similar to metal in the MD of the film, keeps the linear thermal expansion coefficient in TD of the film low, and has uniform orientation angles in the transverse direction of the film. The TD drawing can be carried out after the heat treatment or before the heat treatment. However, it is preferable to carry out the TD drawing concurrent to the heat treatment. The drawing time of the TD drawing is not restricted in particular. However, it is about 5 seconds-10 minutes, and 10 seconds-5 minutes is favorable.

By adjusting both of the drawing rates to be within these ranges, it is possible to manufacture a polyimide film having the necessary orientation angles and having uniform orientation angles in the transverse direction of the film.

The thickness of the polyimide film in the present invention is not restricted in particular. However, it is preferable to be in a range of $\geq 3$ μm and $\leq 250$ μm and a range of $\geq 10$ μm and $\leq 80$ μm is preferable. If it is thinner or thicker than this range, the film manufacturing property is significantly worsen so it is not favorable.

It is possible to apply an annealing treatment to the polyimide film obtained in the manner described above according to the need. Thermal relaxation occurs in the film and the thermal shrinkage factor can be suppressed to a minimum by applying the annealing treatment. As the temperature for the annealing treatment, there is no restriction in particular. However, 200-500° C. is favorable. In the manufacture of the polyimide film in the present invention, there is a tendency for the thermal shrinkage factor to become high in TD due to orientation to the TD of the film is strong. However, it is possible to suppress the thermal shrinkage factor at 200° C. to $\leq 0.05\%$ for both MD and TD of the film by relaxing with the heat from the annealing treatment. This further enhances the dimensional precision so it is favorable. Specifically, it is preferable to carry out the annealing treatment by running the film through a furnace of 200-500° C. at a low tension. The time during which the film is retained in the furnace is considered as the treatment time. The running speed is changed to control this treatment time. Treatment time of 30 seconds-5 minutes is favorable. If the treatment time is less than this, sufficient heat is not conducted to the film. If it is longer, the heating becomes excessive and the flatness is lost so it is not favorable. Also, 10-50 N/m is favorable as the tension of the film at the time of running, and 20-30 N/m is more favorable. If the tension is lower than this range, the running property of the film is worsen and if the tension is high, the thermal shrinkage factor in the running direction of the obtained film will become high so it is not favorable.

The thermal shrinkage factor of the polyimide film in the present invention is not restricted in particular. However, −0.02%-+0.02% is favorable. The thermal shrinkage factor is a value obtained by preparing a film of 20 cm×20 cm, measuring the film dimension (L1) after shelving for 2 days in a room adjusted to 25° C., 60% RH, measuring the film dimension (L2) again after heating for 60 minutes to 200° C. and shelving for 2 days in a room adjusted to 25° C., 60% RH, and calculating according to the following equation.

Thermal shrinkage factor(%)=−(L2−L1)/L1×100    [Formula 1]

It is possible to apply an electrical treatment such as corona treatment or plasma treatment or physical treatment such as blast treatment to the surface of the film to provide adhesiveness to the obtained polyimide film. The atmospheric pressure for carrying out the plasma treatment is not restricted in particular. However, it is normally in a range of 13.3-1330 kPa, a range of 13.3-133 kPa (100-1000 Torr) is preferable, and a range of 80.0-120 kPa (600-900 Torr) is more preferable.

The atmosphere for carrying out the plasma treatment contains at least 20 mol % of an inactive gas, containing ≧50 mol % of the inactive gas is favorable, containing ≧80 mol % is more favorable, and containing ≧90 mol % is most favorable. The aforementioned inactive gas includes He, Ar, Kr, Xe, Ne, Rn, $N_2$, and mixtures of two of more kinds of these gases. The most favorable inactive gas is Ar. Furthermore, it is possible to mix oxygen, air, carbon monoxide, carbon dioxide, carbon tetrachloride, chloroform, hydrogen, ammonia, tetrafluoro methane (carbon tetrafluoride), trichlorofluoro ethane, trifluoro methane, etc. in the aforementioned inactive gas. As favorable combination for the mixed gas used as the atmosphere for the plasma treatment in the present invention, argon/oxygen, argon/ammonia, argon/helium/oxygen, argon/carbon dioxide, argon/nitrogen/carbon dioxide, argon/helium/nitrogen, argon/helium/nitrogen/carbon dioxide, argon/helium, helium/air, argon/helium/monosilane, and argon/helium/disilane can be cited.

The power density when applying the plasma treatment is not restricted in particular. However, ≧200 W·min/m$^2$ is favorable, ≧500 W·min/m$^2$ is more favorable, and ≧1000 W·min/m$^2$ is most favorable. As the plasma irradiation time for carrying out the plasma treatment, 1 second-10 minutes is favorable. By setting the plasma irradiation time within this range, degradation is not caused to the film and effect of the plasma treatment can be manifested sufficiently. The type of gas, gas pressure, and density for the plasma treatment are not restricted to the aforementioned conditions and the plasma treatment is sometimes carried out in the atmosphere.

WORKING EXAMPLES

Below, the effects of the present invention will be explained according to working examples. However, the present invention is not restricted by these working examples. Incidentally, "%" in the examples refers to the weight standard as long as it is not indicated as being otherwise.

The method of measuring the various properties in the present invention will be explained below.

(1) Orientation Angle

Figure 6:
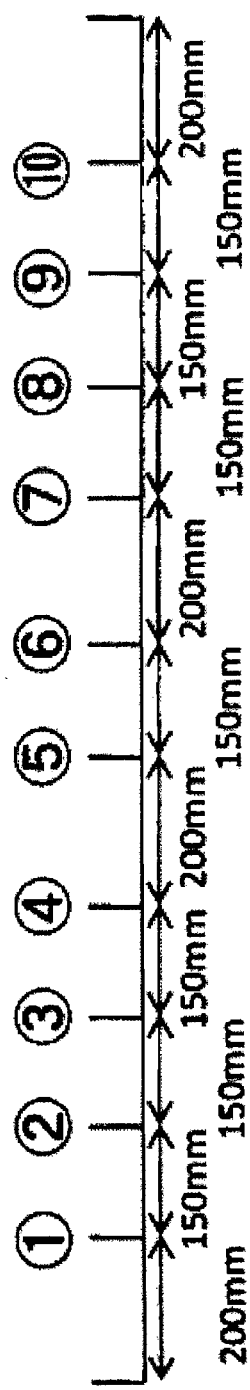
FIG. 6 is a schematic diagram of the cross section showing the position for measuring the orientation angle ($\theta$) in the polyimide film of Comparative Example 2. The numbers in the figure show the positions for measuring the orientation angle.

The orientation angle was measured using SST-2500 (Sonic Sheet Tester) manufactured by Nomura Shoten, Co., Ltd. When SST-2500 was used, the speed of ultrasonic wave in 16 directions was measured automatically at a pitch of 11.25° in the planar direction 0-180° (0° is parallel to MD) of the film. A pattern like that shown in FIG. 3 was depicted when the obtained speed for each direction is summarized into a radar graph (the graph function of Microsoft Excel was used). The line drawn to the most expanded part of the pattern from the center is the orientation axis (g) and with MD as the reference line, angle (h) of the orientation axis is measured from said reference line to obtain the orientation angle. Measurement was carried out at the positions (12 positions) shown in FIG. 4 using the films obtained according to the Working Examples 1-10 and Comparative Examples 1 and 3 to be described below (width 2.2 m). Also, the measurement was carried out at the positions (10 positions) shown in FIG. 6 only in the case of Comparative Example 2 (film width: 1.85 m).

(2) Evaluation of Inorganic Particles

The range of grain size, the average grain size, the share of grain size 0.15-0.60 μm in all particles, and the share of grain size 0.15-0.25 μm in all particles were read from the results of having measured and analyzed the samples dispersed in a polar solvent using laser diffraction/scattering particle size distribution analyzer LA-910 manufactured by Horiba Seisakusho Co., Ltd.

Composition Example 1

Pyromellitic acid dianhydride (molecular weight 218.12)/3,3',4,4'-biphenyl tetracarboxylic acid dianhydride (molecular weight 294.22)/4,4'-diamino diphenyl ether (molecular weight 200.24)/paraphenylene diamine (molecular weight 108.14) were prepared at a ratio of 75/25/71/29 in mol ratio, composed into a 20 wt % solution in DMAc (N,N-dimethyl acetamide) to polymerize, and a polyamide acid solution of 3500 poise was obtained.

Composition Example 2

Pyromellitic acid dianhydride (molecular weight 218.12)/3,3',4,4'-biphenyl tetracarboxylic acid dianhydride (molecular weight 294.22)/4,4'-diamino diphenyl ether (molecular weight 200.24)/paraphenylene diamine (molecular weight 108.14) were prepared at a ratio of 80/20/75/25 in mol ratio, composed into a 20 wt % solution in DMAc (N,N-dimethyl acetamide) to polymerize, and a polyamide acid solution of 3500 poise was obtained.

Composition Example 3

Pyromellitic acid dianhydride (molecular weight 218.12)/3,3',4,4'-biphenyl tetracarboxylic acid dianhydride (molecular weight 294.22)/4,4'-diaminodiphenyl ether (molecular weight 200.24)/paraphenylene diamine (molecular weight 108.14) were prepared at a ratio of 75/25/69/31 in mol ratio, composed into a 20 wt % solution in DMAc (N,N-dimethyl acetamide) to polymerize, and a polyamide acid solution of 3500 poise was obtained.

Composition Example 4

Pyromellitic acid dianhydride (molecular weight 218.12)/3,3',4,4'-biphenyl tetracarboxylic acid dianhydride (molecular weight 294.22)/4,4'-diaminodiphenyl ether (molecular weight 200.24)/paraphenylene diamine (molecular weight 108.14) were prepared at a ratio of 65/35/80/20 in mol ratio, composed into a 20 wt % solution in DMAc (N,N-dimethyl acetomide) to polymerize, and a polyamide acid solution of 3500 poise was obtained.

Composition Example 5

Pyromellitic acid dianhydride (molecular weight 218.12)/ 3,3',4,4'-biphenyl tetracarboxylic acid dianhydride (molecular weight 294.22)/3,4'-diaminodiphenyl ether (molecular weight 200.24)/paraphenylene diamine (molecular weight 108.14) were prepared at a ratio of 75/25/80/20 in mol ratio, composed into a 20 wt % solution in DMAc (N,N-dimethyl acetoamide) to polymerize, and a polyamide acid solution of 3500 poise was obtained.

Composition Example 6

3,3',4,4'-biphenyl tetracarboxylic acid dianhydride (molecular weight 294.22)/paraphenylene diamine (molecular weight 108.14) were prepared at a ratio of 1/1 in mol ratio, composed into a 20 wt % solution in DMAc (N,N-dimethyl acetamide) to polymerize, and a polyamide acid solution of 3500 poise was obtained.

Composition Example 7

Pyromellitic acid dianhydride (molecular weight 218.12)/ 3,3',4,4'-biphenyl tetracarboxylic acid dianhydride (molecular weight 294.22)/4,4'-diaminodiphenyl ether (molecular weight 200.24)/paraphenylene diamine (molecular weight 108.14) were prepared at a ratio of 75/25/66/34 in mol ratio, composed into a 20 wt % solution in DMAc (N,N-dimethyl acetamide) to polymerize, and a polyamide acid solution of 3500 poise was obtained.

Working Example 1

N,N-dimethyl acetamide slurry of silica wherein the grain size of all particles measured with laser diffraction/scattering particle size distribution analyzer LA-910 (Horiba Seisakusho) is in the range of $\geq 0.01$ μm $\leq 1.5$ μm, the average grain size (average volumetric grain size) is 0.42 μm, and particles of grain size 0.15-0.60 μm accounts for 89.9 vol % of all particles with regards to the grain distribution (volumetric standard) was added at 0.04 wt % per resin weight in the polyamide acid solution obtained in Composition Example 1 and agitated thoroughly to disperse. Anhydrous acetate (molecular weight 102.09) and β-picoline were mixed and agitated in this polyamide acid solution at a ratio of 17 wt % and 17 wt % respectively with respect to the polyamide acid solution. The resulting mixture was cast on a 75° C. stainless steel drum rotated by a T-type slit die and a gel film having self supporting property, residual volatile components 55 wt %, and thickness about 0.05 mm was obtained. This gel film was peeled off from the drum and conveyed with two sets of nip rolls. At this time, vertical drawing was carried out in 2-steps by changing the rotational speeds of stainless steel drum (R1), first nip roll (R2), and second nip roll (R3) so that the respective drawing rate is as shown in Table 2. After the vertical drawing, treatment was applied for 250° C.×50 seconds, 400° C.×75 seconds in a heating furnace by holding the two ends and a polyimide film of width 2.2 m and thickness 38 μm was obtained. For the horizontal drawing, the heating furnace for removing the solvent was set to be the maximum at the time of passage (250° C.×50 seconds). The drawing rate was the maximum drawing rate at the time of the aforementioned passage through the heating furnace and the transverse drawing rate decreased after passing through the heating furnace. The horizontal drawing rate was obtained as a value that divided the film width of maximum horizontal drawing rate with the width of the gel film after peeling off from the drum. The horizontal drawing rates are shown in Table 2. The orientation angle (θ) of the obtained polyimide film was measured at the 12 points shown in FIG. 4. In the measurement, the speed of ultrasonic wave was measured with ST-2500 (manufactured by Nomura Shoji, Co., Ltd.), and the obtained results were summarized into a radar graph (FIG. 5A-5L). The orientation angles (θ) were obtained from FIG. 5A-5L. The results are shown in Table 2.

Working Examples 2-6

Figure 4:
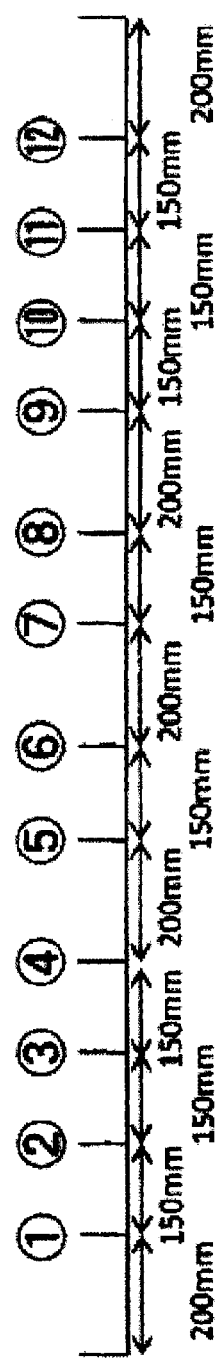
FIG. 4 is a schematic diagram of the cross section showing the position for measuring the orientation angle ($\theta$) in the polyimide films of Working Examples 1-10 and Comparative Examples 1 and 3. The numbers in the figures indicate the positions for measuring the orientation angle.
Figure 5A:
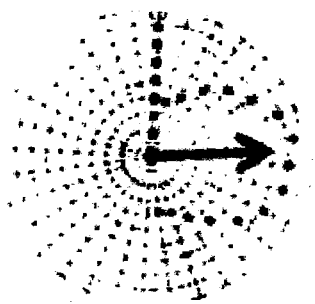
FIGS. 5A-5L shows the radar graph and orientation axis obtained from the results of having measured the speed of ultrasonic wave at each of the 12 measurement positions shown in FIG. 4 of the polyimide film obtained in Working Example 1.
Figure 5B:
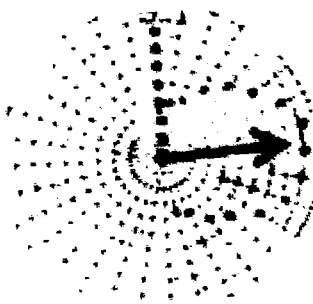
Figure 5C:
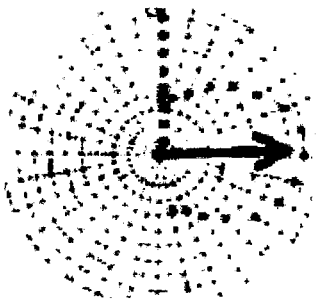
Figure 5D:
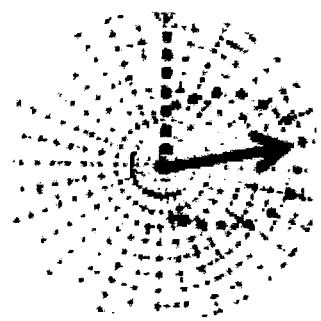
Figure 5E:
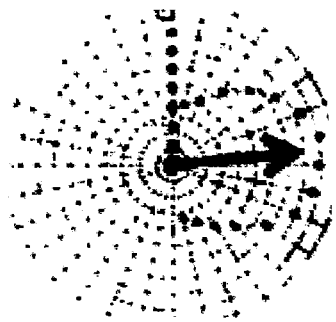
Figure 5F:
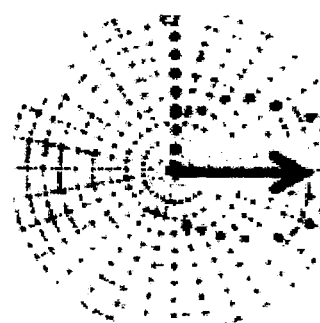
Figure 5G:
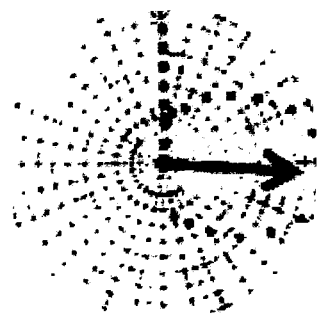
Figure 5H:
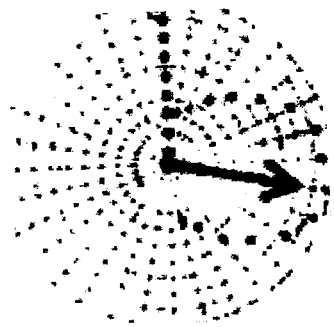
Figure 5I:
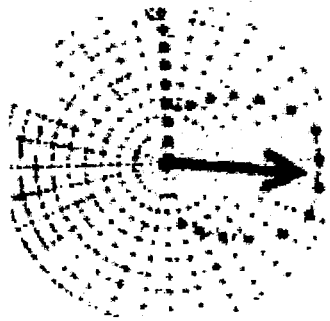
Figure 5J:
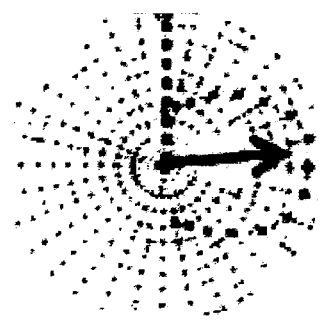
Figure 5K:
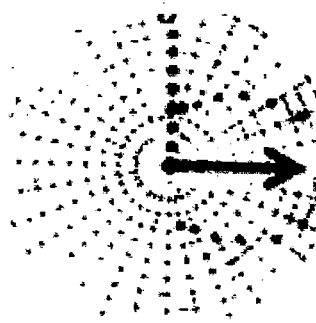
Figure 5L:
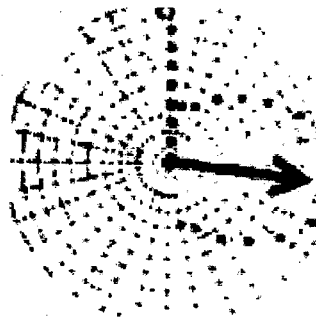

The orientation angle (θ) of the polyimide films of thickness 38 μm obtained in the same manner as Working Example 1 except for respectively setting the polyamide acid solution used, vertical drawing rate, and horizontal drawing rate as shown in Table 2 was measured at the 12 points shown in FIG. 4. The measured results are shown in Table 2.

Working Examples 7-10

The orientation angle (θ) of the polyimide films obtained in the same manner as Working Example 1 except for respectively setting the polyamide acid solution used, vertical drawing rate, horizontal drawing rate, and film thickness as shown in Table 2 was measured at the 12 points shown in FIG. 4. The measured results are shown in Table 2.

TABLE 2

|  | Working Example 1 | Working Example 2 | Working Example 3 | Working Example 4 | Working Example 5 | Working Example 6 | Working Example 7 | Working Example 8 | Working Example 9 | Working Example 10 |
|---|---|---|---|---|---|---|---|---|---|---|
| Polyamide acid solution | Composition Example 1 | Composition Example 2 | Composition Example 3 | Composition Example 4 | Composition Example 5 | Composition Example 6 | Composition Example 2 | Composition Example 2 | Composition Example 4 | Composition Example 4 |
| Vertical drawing rate 1 (R2/R1) | 1.06 | 1.05 | 1.08 | 1.07 | 1.07 | 1.04 | 1.06 | 1.05 | 1.08 | 1.08 |
| Vertical drawing rate 2 (R3/R2) | 1.06 | 1.04 | 1.07 | 1.06 | 1.07 | 1.04 | 1.06 | 1.05 | 1.08 | 1.08 |
| Total vertical drawing rate (R3/R1) | 1.12 | 1.09 | 1.16 | 1.13 | 1.14 | 1.08 | 1.12 | 1.10 | 1.17 | 1.17 |
| Horizontal drawing rate | 1.45 | 1.52 | 1.48 | 1.50 | 1.44 | 1.50 | 1.48 | 1.44 | 1.49 | 1.47 |

TABLE 2-continued

|  |  | Working Example 1 | Working Example 2 | Working Example 3 | Working Example 4 | Working Example 5 | Working Example 6 | Working Example 7 | Working Example 8 | Working Example 9 | Working Example 10 |
|---|---|---|---|---|---|---|---|---|---|---|---|
| Film thickness (μm) |  | 38 | 38 | 38 | 38 | 38 | 38 | 25 | 50 | 20 | 13 |
| Orientation angle θ (°) | 1 | 81 | 94 | 78 | 81 | 78 | 80 | 79 | 102 | 97 | 100 |
|  | 2 | 88 | 79 | 82 | 84 | 78 | 84 | 94 | 81 | 86 | 81 |
|  | 3 | 88 | 80 | 85 | 86 | 84 | 80 | 80 | 84 | 86 | 83 |
|  | 4 | 79 | 92 | 82 | 93 | 88 | 96 | 87 | 92 | 88 | 83 |
|  | 5 | 81 | 84 | 90 | 86 | 92 | 100 | 93 | 86 | 90 | 88 |
|  | 6 | 90 | 88 | 88 | 90 | 90 | 88 | 94 | 84 | 90 | 86 |
|  | 7 | 92 | 92 | 90 | 92 | 84 | 99 | 92 | 86 | 92 | 94 |
|  | 8 | 101 | 96 | 92 | 90 | 94 | 95 | 96 | 90 | 96 | 94 |
|  | 9 | 95 | 92 | 86 | 85 | 102 | 102 | 87 | 84 | 82 | 90 |
|  | 10 | 81 | 96 | 95 | 93 | 98 | 100 | 94 | 94 | 94 | 98 |
|  | 11 | 90 | 96 | 92 | 90 | 86 | 97 | 98 | 100 | 94 | 98 |
|  | 12 | 96 | 102 | 100 | 87 | 98 | 99 | 98 | 76 | 88 | 92 |

Comparative Example 1

The same process as in Working Example 1 was carried out up to obtaining a gel film having self supporting property, residual volatile components 55 wt %, and thickness about 0.05 mm. After peeling off this gel film from the drum, drawing was carried out without using the first nip roll (R2) and using only the stainless steel drum (R1) and second nip roll (R3) so that the vertical drawing rate in the first step is made as shown in Table 3. After the vertical drawing, treatment was applied for 250° C.×50 seconds, 400° C.×75 seconds in a heating furnace by holding the two ends, and a polyimide film of width 2.2 m and thickness 38 μm was obtained. For the horizontal drawing, the heating furnace for removing the solvent was set to be the maximum at the time of passage (250° C.×50 seconds). The horizontal drawing rate was obtained with a value that divided the film width of maximum horizontal drawing rate with the width of the gel film after peeling off from the drum. The horizontal drawing rates are shown in Table 3. The orientation angle (θ) of the obtained polyimide film was measured at the 12 points shown in FIG. 4. The measured results are shown in Table 3.

Comparative Example 2

The orientation angle (θ) of the polyimide films of thickness 38 μm obtained in the same manner as Working Example 1 except for using the polyamide acid solution in Composition Example 7 and respectively setting the vertical drawing rate and horizontal drawing rate as shown in Table 3 was measured. The results are shown in Table 3. Incidentally, the rigidity of the polyamide acid obtained from Composition Example 7 was high, horizontal drawing rate equal to that for the polyamide acids in Composition Example 1-6 could not be applied, and the width of the obtained film was narrow of 1.85 m. Therefore, the orientation angle (θ) was measured at the 10 points shown in FIG. 6 only in the case of Comparative Example 2. The results are shown in Table 3.

Comparative Example 3

The orientation angle (θ) of the polyimide films of thickness 38 μm obtained in the same manner as Working Example 1 except for using the polyamide acid solution in Composition Example 4 and respectively setting the vertical drawing rate and horizontal drawing rate as shown in Table 4 was measured. The results are shown in Table 3.

TABLE 3

|  |  | Comparative Example 1 | Comparative Example 2 | Comparative Example 3 |
|---|---|---|---|---|
| Polyamide acid solution |  | Composition Example 1 | Composition Example 7 | Composition Example 4 |
| Vertical drawing rate 1 (R2/R1) |  | — | 1.09 | 1.14 |
| Vertical drawing rate 2 (R3/R2) |  | — | 1.08 | 1.14 |
| Total vertical drawing rate (R3/R1) |  | 112 | 1.18 | 1.30 |
| Horizontal drawing rate |  | 1.45 | 1.24 | 1.40 |
| Film thickness (μm) |  | 38 | 38 | 38 |
| Orientation angle θ (°) | 1 | 117 | 115 | 124 |
|  | 2 | 114 | 102 | 121 |
|  | 3 | 98 | 94 | 118 |
|  | 4 | 92 | 86 | 103 |
|  | 5 | 98 | 96 | 102 |
|  | 6 | 94 | 90 | 101 |
|  | 7 | 88 | 93 | 87 |
|  | 8 | 81 | 84 | 85 |
|  | 9 | 80 | 81 | 90 |
|  | 10 | 78 | 74 | 84 |
|  | 11 | 75 | — | 58 |
|  | 12 | 60 | — | 56 |

The orientation angles of the polyimide film in Comparative Example 1 measured at 12 points were 60°-117°, the orientation angles of the polyimide film in Comparative Example 2 measured at 10 points were 74°-115°, and the orientation angles of the polyimide film in Comparative Example 3 measured at 12 points were scattered in a wide range of 56°-124° ppm/° C. On the other hand, the orientation angles were uniform in Working Examples 1-10 of the present invention regardless of the measuring position. The orientation angles is uniform no matter the position on the film hence it was confirmed that proper use according to the position of the film is unnecessary.

Industrial Field of Application

The polyimide film of the present invention has uniform orientation angles regardless of the position of the film hence it is valuable for fine pitch circuit boards, in particular, for COF (Chip on Film), which are wired at a narrow pitch in TD of the film.

Explanation of the Reference Alphabets (a) width of the fabricated polyimide film
(b) the point at a position 0 mm inside from the ends in the width direction of the fabricated film (b') the point at a position 200 mm inside from the ends in the width direction of the fabricated film
(c) the point within center part ±200 mm in the width direction of the fabricated film
(d) an optional point on the linear line connecting b and b'
(d') an optional point on the linear line connecting b and b'
(e) polyimide film
(f) central value of the measured orientation angles
(g) orientation axis
(h) orientation angle (θ)
(i) speed of ultrasonic wave at each angle

What is claimed is:

1. A polyimide film obtained by biaxial drawing process in the machine direction (MD) and transverse direction (TD) of the film and the MD drawing is a 2-step drawing; the film characterized by the fact that the width of the fabricated film is ≧1 m, 2 points positioned inside by 200 mm from both ends of the width of the fabricated film are selected on a linear line in the vertical direction to the machine direction (MD) of the film, 1 point within center part ±200 mm, and 2 optional points are further selected on a linear line that includes said 2 points within the range of the linear line that connects said 2 points, and the orientation angle (θ) is within a range of 90°±23° with the machine direction (MD) as a reference in at least all of these 5 points.

2. The polyimide film according to aforementioned claim 1, characterized by the fact that the orientation angle (θ) is within a range of 90°±12° with the machine direction (MD) as a reference.

3. The polyimide film according to aforementioned claim 1 wherein the width of the fabricated film is ≧1.5 m, 2 points positioned inside by 200 mm from both ends of the width of the fabricated film are selected on a linear line in the vertical direction to the machine direction (MD) of the film, 1 point within center part ±150 mm, and 5 optional points are further selected on a linear line that includes said 2 points within the range of the linear line that connects said 2 points, and the orientation angle (θ) is within a range of 90°±23° with the machine direction (MD) as a reference in at least all of these 8 points.

4. The polyimide film according to aforementioned claim 3, characterized by the fact that orientation angle (θ) is within a range of 90°±12° with the machine direction (MD) as a reference.

5. The polyimide film according to aforementioned claim 3, characterized by the fact that orientation angle (θ) is within a range of 90°±12° with the machine direction (MD) as a reference.

6. The polyimide film according to aforementioned claim 1 wherein the width of the fabricated film is ≧2 m, 2 points positioned inside by 200 mm from both ends of the width of the fabricated film are selected on a linear line in vertical direction to the machine direction (MD) of the film, 1 point within center part ±100 mm, and 8 optional points are further selected on a linear line that includes said 2 points within the range of the linear line that connects said 2 points, and the orientation angle (θ) is within a range of 90°±23° with the machine direction (MD) as a reference in at least all of these 11 points.

7. The polyimide film according to aforementioned claim 1, characterized by the fact that the drawing rate in the first step of the 2-step MD drawing process is ≧40% of the total MD drawing rate.

8. The polyimide film according to aforementioned claim 1, characterized by the fact that the TD drawing rate is ≧1.10 and ≦1.50 of the total MD drawing rate.

9. The polyimide film according to aforementioned claim 1, characterized by the fact that the polyimide film is manufactured from a polyamide acid composed from an aromatic diamine component wherein the mol ratio of 4,4'-diamino diphenyl ether and/or 3,4'-diamino diphenyl ether and paraphenylene diamine is 69/31-90/10, and an acid anhydride component wherein the mol ratio of pyromellitic acid dianhydride and 3,3',4,4'-biphenyl tetracarboxylic acid dianhydride is 80/20-60/40, or manufactured from a polyamide acid composed from an aromatic diamine component which is a paraphenylene diamine, and a 3,3',4,4'-biphenyl tetracarboxylic acid dianhydride component and the mol ratio of the aromatic diamine component and the acid anhydride component is 40/60-60/40.

10. The polyimide film according to aforementioned claim 1, characterized by the fact that microsilica wherein the grain size of all particles is ≧0.01 μm and ≦1.5 μm and the particles with grain size of ≧0.10 μm and ≦0.90 μm accounts for ≧80 vol % of all particles is evenly dispersed in the film at a ratio of ≧0.30 wt % and ≦0.80 wt % of the film resin weight.

* * * * *